United States Patent [19]

Lüpertz et al.

[11] 4,280,738
[45] Jul. 28, 1981

[54] TANDEM MASTER CYLINDER

[75] Inventors: Hans-Henning Lüpertz, Darmstadt; Peter Riedel, Hattersheim, both of Fed. Rep. of Germany

[73] Assignee: ITT Industries, Inc., New York, N.Y.

[21] Appl. No.: 39,612

[22] Filed: May 16, 1979

[30] Foreign Application Priority Data

Jul. 10, 1978 [DE] Fed. Rep. of Germany ....... 2830220
Jul. 10, 1978 [DE] Fed. Rep. of Germany ....... 2830221
Jul. 10, 1978 [DE] Fed. Rep. of Germany ....... 2830222

[51] Int. Cl.³ ..................... B60T 8/02; B60T 11/20
[52] U.S. Cl. ................ 303/6 C; 188/349; 188/345; 303/52
[58] Field of Search ............ 303/6 C, 6 R, 52; 188/349, 345; 60/582, 574, 591, 562, 561

[56] References Cited

U.S. PATENT DOCUMENTS

| | | |
|---|---|---|
| 3,926,476 | 12/1975 | Mathues ........................ 303/6 C |
| 3,938,333 | 2/1976 | Mathues ..................... 303/6 C X |
| 3,964,795 | 6/1976 | Mathues ........................ 303/6 C |

FOREIGN PATENT DOCUMENTS 2604664 8/1976 Fed. Rep. of Germany.

*Primary Examiner*—Douglas C. Butler
*Attorney, Agent, or Firm*—John T. O'Halloran; Alfred C. Hill

[57] ABSTRACT

In a known tandem master cylinder with a regulator, machining and assembly of the parts is complicated which renders the master cylinder costly. Moreover, such an arrangement is only realizable with master cylinders having a large diameter. There are also functional disadvantages, particularly in the event of failure of one brake circuit, the brake fluid volume consumption of the other brake circuit is materially increased which results in an additional increase of the pedal travel. To avoid these shortcomings, the present invention provides a tandem master cylinder with a regulator including an arrangement, which in the event of failure of the front-axle brake circuit, mechanically actuates the regulator valve coupled to the rear-axle brake circuit by a pressure piston to keep the regulator valve in the open position to enable unreduced braking pressure to be coupled to the rear-axle brake circuit.

40 Claims, 3 Drawing Figures

TANDEM MASTER CYLINDER

BACKGROUND OF THE INVENTION

This invention relates to a dual circuit vehicle hydraulic brake system and more particularly to a tandem master cylinder with a regulator for such a system.

German Patent DE-OS No. 2,604,664 discloses a tandem master cylinder with regulator for a vehicle hydraulic brake system comprising essentially a housing with a stepped bore and two pressure pistons movable therein. The pressure pistons form boundaries for two pressure chambers of which a first pressure chamber connects with the wheel brake cylinders of a front axle, and the second pressure chamber connects with the wheel brake cylinders of a rear axle with a brake force regulator being interposed therebetween. In this arrangement, the pressure pistons are dimensioned in such a manner that the pressure generated in the first pressure chamber associated with the front-axle brake circuit is higher than the pressure in the second pressure chamber associated with the rear-axle brake circuit. The lower brake pressure in the rear-axle circuit is reduced by the regulator when the pressure has reached a predetermined limit. The regulator includes essentially a stepped piston on which a control spring bears and a valve whose closure member is secured to an operating piston. The operating piston is subjected to the pressure of the front-axle brake circuit on its one end and to the non-regulated pressure of the rear-axle brake circuit on its other end. In the event of a failure of the front-axle brake circuit, the operating piston is operated to prevent closing of the regulator valve, i.e., there occurs no reduction of the brake pressure in the rear-axle brake circuit.

The arrangement of the above cited German Patent is costly from the point of view of machining and assembly because it necessitates a large number of individual components which sometimes are of complicated construction. This results in high manufacturing costs. Moreover, such a design is only realizable with master cylinders having a relatively large diameter.

As described in the foregoing, it is characteristic of the known arrangement that, as a result of the great difference in the effective surface of the two pressure pistons, the pressure generated in the second pressure chamber associated with the rear-axle brake circuit is substantially lower than the pressure in the first pressure chamber associated with the front-axle brake circuit. This is appropriate if both brake circuits are operable and the brake force at the vehicle rear wheels is to be lower than at the vehicle front wheels. This is, however, taken care of by the regulator provided when the pressure reaches a predetermined limit. However, in the event of a failure of the front-axle brake circuit because of a defect, the regulator is put out of circuit and the brakes of the vehicle rear wheels are subjected to the reduced brake pressure only. However, in the event of failure of the one brake circuit it is extremely important to achieve the best possible braking effect with the intact brake circuit.

The demand for a sufficient braking action of the rear-wheel brakes in the event of failure of the front-axle brake circuit also contrasts with the fact that the movement of the operating piston occurring in that event results in the consumption of a high amount of brake fluid, which is further increased by the displacement of the stepped piston. The brake pedal travel which is appreciable enough if a brake circuit has failed is thus further increased as a result of the additional fluid consumption.

The operating piston is only actuated in the event of a defect and, hence, the ring seals sealing the operating piston are not moved. It is known that seals which are not moved over a prolonged period of time are destroyed when suddenly loaded. It is then necessary to repair the master cylinder.

SUMMARY OF THE INVENTION

It is, therefore, an object of the present invention to provide a tandem master cylinder with a regulator of the type referred to hereinabove, which does not have the shortcomings of known arrangements, permits a high braking effect to be achieved at the vehicle rear wheels in the event of failure of the front-axle brake circuit, and is characterized by simple construction and reliable operation of all parts. In addition, the manufacturing costs of the entire arrangement are lower than in the known arrangements.

A feature of the present invention is the provision of a tandem master cylinder with a regulator for a vehicle hydraulic brake system comprising: a first pressure piston; a first pressure chamber bounded by one end of the first pressure piston coupled to a front-axle brake circuit; a second pressure chamber connected to a regulator input of the regulator, the regulator being disposed adjacent the other boundary of the first pressure chamber and further including a regulator output coupled to a rear-axle brake circuit, at least one stepped piston loaded by a control spring and a regulator valve; and means associated with the first pressure piston and the regulator valve to mechanically actuate the regulator valve by the first pressure piston to maintain the regulator valve open upon failure of the front-axle brake circuit.

The essential advantages of the tandem master cylinder with a regulator of the present invention are particularly that it is of simple construction, reliable operation and permits a high braking effect to be achieved at the vehicle rear wheels when the front-axle brake circuit has failed. Three features contribute particularly to the reliable operation:

1. All movable parts and their seals are loaded on each braking action which keeps the seals soft;
2. A blocking device for keeping the valve open is actuated mechanically when the front-axle brake circuit fails, the force used to accomplish this is so high that the blocking function occurs reliably; and
3. The actuation of the blocking device does not result in an additional brake fluid consumption.

The means for mechanically actuating the control device when the front-axle brake circuit has failed is suitably an extension of a first pressure piston projecting into the first pressure chamber. This is a simple and safe design. The valve is advantageously provided with a control device subjected to the pressure in the first pressure chamber. During normal operation, this control device may influence the control behavior and is the mechanical blocking member between the pressure piston and the valve in the event of failure of the front-axle brake circuit. In a preferred improvement of the subject-matter of the present invention, the control device comprises a piston which is preloaded in opposition to its mechanical actuating direction by means of a spring. During normal function of the tandem master cylinder, the piston operates as a control piston, acting on the tappet of the valve-closure member, while it operates as a blocking device in the event of failure of the front-axle brake circuit.

The unitized construction of master cylinder and regulator results in a saving of space and weight. It is, therefore, an advantage to arrange the regulator in the housing of the tandem master cylinder. In a preferred improvement of this arrangement, the housing includes a smooth bore in which the master cylinder pistons and the regulator are located in tandem. This arrangement is also realizable with relatively small diameters of the master cylinder pistons and affords the advantage of permitting for the most part the use of standard components of conventional tandem master cylinders.

The regulator comprises suitably a stepped piston with a valve disposed therein, the smaller piston step forming a boundary for a regulator inlet chamber and the larger piston step forming a boundary for a regulator outlet chamber. This known regulator design has proved efficient because of its simple construction and safe operation. The stepped piston is suitably inserted in at least one sleeve including a multiple stepped bore. This affords the advantage of permitting the regulator to be inserted in the extended end of the master-cylinder bore as a cartridge. The regulator cartridge is fastened in a particularly simple manner by securing the sleeve, on its side close to the first pressure chamber, by means of a ring disposed in the housing bore of the tandem master cylinder, and, on the other side, by means of a coupling nut screwed onto the end of the housing.

In a preferred embodiment of the regulator valve, the stepped piston houses a valve-closure member bearing through a tappet against a radially enlarged end of the other piston. Thus, the valve is actuated by the movement of both the stepped piston and the other piston.

To achieve a safe blocking function of the other piston in the event of failure of the front-axle brake circuit, the arrangement is designed such that the maximum displacement travel of the stepped piston is larger than the closing travel of the valve, and the displacement travel of the blocking piston is larger than the difference between the displacement travel of the stepped piston and the travel required for closing of the valve.

In a particularly advantageous embodiment of the invention, the larger step of the stepped piston is formed as a valve-closure member, and the valve seat is a ring situated adjacent the smaller step of the stepped piston.

The substantial advantages afforded by this arrangement are in particular a reduction of the manufacturing costs as a result of a lower number of individual components and a reduction of the overall length.

In a suitable improvement of the foregoing arrangement, the stepped piston has on its smaller step a peg-shaped end extending into the first pressure chamber, with a stop means being provided on the larger step. In the event of a failure of the front-axle brake circuit, the first pressure piston shifts an amount until it abuts against the peg-shaped end of the stepped piston, holding the latter with its stop against the front wall of the housing. This has the advantage that the stepped piston of the regulator is not moved at all in the event of failure of the front-axle brake circuit so that the brake fluid volume in the rear-axle brake circuit is not increased.

The ring which serves as a valve seat suitably bears, on the side close to the regulator outlet chamber, against the housing's front wall by the intermediary of a spacer ring and, on the other side, against a component secured to the housing by the intermediary of a washer and a spring. This arrangement determines the position of the ring and the valve-closing travel, respectively, in addition to ensuring safe opening of the valve when the pressure in the regulator inlet chamber is reduced which occurs, for example, when the brake pedal is released.

In a preferred embodiment of the present invention, the regulator is disposed in the interior of a second pressure piston. The advantages afforded by this embodiment are that the tandem master cylinder is of reduced overall length and requires no fluid line between the second pressure chamber and the regulator.

Since the second pressure piston forms the regulator housing and displacement of the regulator housing relative to the port of the fluid line leading to be rear axle occurs when the brake is applied, it is advantageous for the transmission of brake fluid that the second pressure piston includes an annular chamber which is in communication with a regulator outlet chamber and with the wheel brake cylinders of the rear-axle brake circuit.

In a preferred improvement of this embodiment, the second piston includes a multiple stepped coaxial bore which accommodates the stepped piston subjected to pressure at its end surfaces, a blocking piston and in which the control spring is supported. Thus, the stepped and control piston construction may be used advantageously also in a regulator disposed in the pressure piston, with suitable changes being made.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
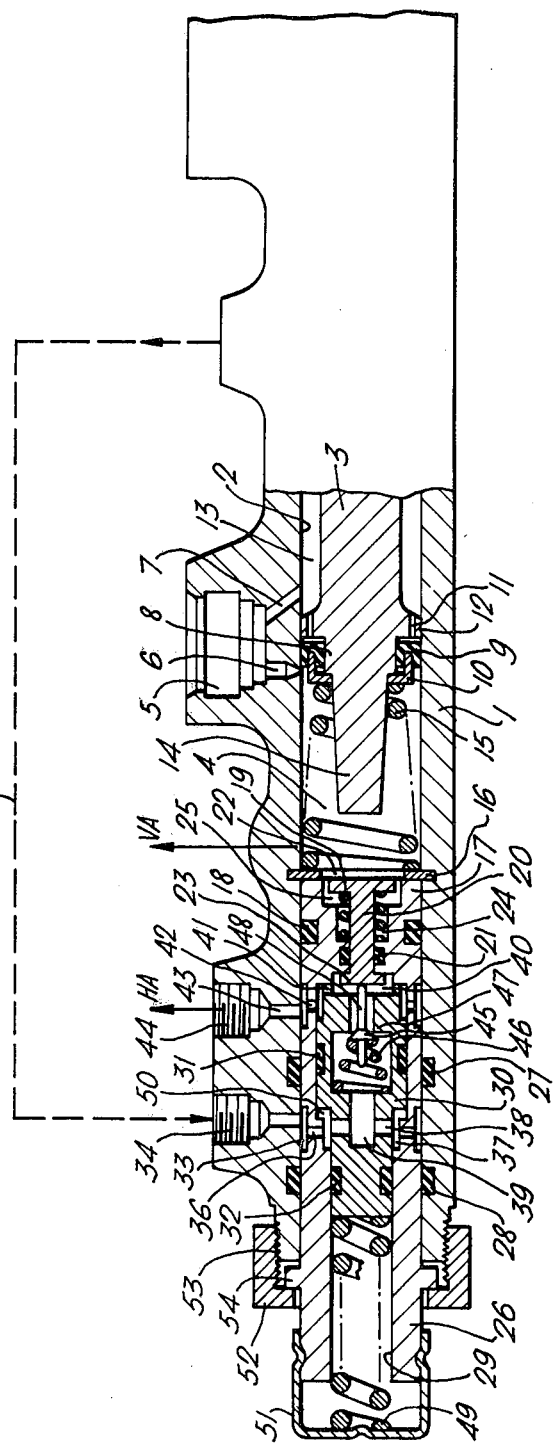
FIG. 1 is a partial longitudinal cross-sectional view of one embodiment of a tandem master cylinder with a regulator disposed in the master-cylinder bore in accordance with the principles of the present invention.

FIG. 1 shows a tandem master cylinder capable of generating pressure for a front-axle brake circuit in that portion of FIG. 1 shown in section to the right of ring 16 and generating pressure for a rear-axle brake circuit in that portion of FIG. 1 not sectioned to the right of ring 16. The unsectioned portion has a construction identical to the construction of the sectioned portion, which will now be described. In a housing 1 a cylindrical bore 2 is disposed coaxial of the longitudinal axis of housing 1 and extends over the entire length of housing 1. Bore 2 accommodates a first axially slidable, cylindrical pressure piston 3 forming with its end surface a boundary for a first pressure chamber 4. First pressure chamber 4 connects with wheel brake cylinders, not shown in the drawing, of a front-axle brake circuit. This is indicated by arrow VA. Housing 1 includes a bore 5 to receive a reservoir connector (not shown) from which a feed port 6 and a compensation port 7 open into bore 2. First pressure piston 3 has a cylindrical step 8 on which a collar seal 9 with a support ring 10 is arranged, collar seal 9 abutting against a shoulder 11 of piston 3. Shoulder 11 includes several parallel openings 12 extending from the abutment side of collar seal 9 into an annular chamber 13. In the area of annular chamber 13, compensating port 7 opens into bore 2. A conical extension 14 of pressure piston 3 projects into first pressure chamber 4.

Conical extension 14 is received in a compression spring 15 bearing with one end against support ring 10 and with its other end against a ring 16 secured in bore 2 and fastened to housing 1. Compression spring 15 serves to return first pressure piston 3. On the side of ring 16 remote from pressure piston 3, bore 2 accommodates a first cylindrical sleeve portion 17 coaxial of the longitudinal axis of housing 1 and in a fixed position in bore 2 which provides a boundary for first pressure chamber 4 and is sealed relative to bore 2 of housing 1 by means of a seal 18. First sleeve portion 17 includes a multiple stepped cylindrical bore 19 coaxial of the longitudinal axis of housing 1 accommodating in its narrowest part a cylindrical piston 20 coaxial of the longitudinal axis of housing 1 which, because of its function, is referred to as a blocking piston 20 in the further description. Blocking piston 20 is sealed relative to first sleeve 17 by means of a seal 21. The ends 22 and 23 of blocking piston 20 have radial extensions serving to limit its axial movement. A helical spring 24 is engaged between a step of bore 19 of first sleeve portion 17 and end 22 and bears upon blocking piston 20 in the direction of first pressure chamber 4 whereby in the inactive position of the arrangement end 22 is held at a specific distance from a stop 25.

Adjacent to the end of first sleeve portion 17 remote from ring 16 is a second cylindrical sleeve portion 26 coaxial of the longitudinal axis of housing 1 and in a fixed position in bore 2 which forms together with first sleeve portion 17 a housing for a regulator. The second sleeve portion 26 is sealed relative to bore 2 of housing 1 by means of two seals 27 and 28. Second sleeve portion 26 includes a stepped cylindrical bore 29 coaxial of the longitudinal axis of housing 1 accommodating a cylindrical stepped piston 30 coaxial of the longitudinal axis of housing 1 which is selaed relative to sleeve portion 26 by means of two ring seals 31 and 32.

An annular chamber 33 into which a fluid port 34 terminates is provided on the circumference of second sleeve portion 26 between seals 27 and 28. Fluid port 34 connects with a second pressure chamber located in the part of the drawing not shown in section through a fluid conduit 35. Disposed in second sleeve portion 26 are radial fluid orifices 36 which connect annular chamber 33 with a regulator inlet chamber 37. Regulator inlet chamber 37 is bounded by an annular surface of stepped piston 30. A radial bore 38 and a coaxial fluid passageway 39 in the interior of stepped piston 30 connect regulator inlet chamber 37 with a regulator outlet chamber 40 which is bounded by the end surface of the larger step of piston 30.

On the end surface of the larger step of piston 30, stop means 41 is provided through which stepped piston 30 bears against first sleeve portion 17. Fluid orifices 42 disposed radially in first sleeve portion 17 connect regulator outlet chamber 40 with an annular chamber 43 into which a fluid port 44 opens which connects with the wheel brake cylinders, not shown in the drawing, of a rear-axle brake circuit (indicated by arrow HA).

Fluid passageway 39 houses a valve-closure member 45 which is loaded against a valve seat 47 by a spring 46. Valve-closure member 45 includes a tappet 48 which extends axially out of stepped piston 30 and bears against end 23 of blocking piston 20.

The smaller step of the stepped piston 30 is loaded by a control spring 49 against whose force stepped piston 30 is slidable up to a stop 50. Control spring 49 bears against a cap 51 secured to the free end of second sleeve portion 26. A coupling nut 52 fitted over the free end of second sleeve portion 26 is screwed onto a thread 53 located at the end of housing 1. Coupling nut 52, which acts on a flange 54 of second sleeve 26, urges second sleeve 26 against first sleeve 17 which is thereby urged against ring 16.

The mode of operation of the tandem master cylinder with a regulator of FIG. 1 shall first be described for the normal case, that is, both brake circuits intact, with the front-axle brake circuit being looked at first because this mode of operation applies identically to the portion of the master cylinder not illustrated in section in FIG. 1.

When the brake pedal is depressed, first pressure piston 3 is moved to the left against the force of spring 15, whereby collar seal 9 overtravels feed port 6 and closes first pressure chamber 4. The pressure in pressure chamber 4 is increased and propagates through the brake piping up to the cylinders of the front-wheel brakes.

A pressure is produced in the same manner in a similar pressure chamber located in the unsectioned portion of the tandem master cylinder and is transmitted through fluid conduit 35, fluid port 34, annular chamber 33 and radial fluid orifices 36 into regulator inlet chamber 37. Since stepped piston 30 is initially urged to the right against first sleeve portion 17 by the force of spring 49 as a result of which tappet 48 of valve-closure member 45 is in abutment with end 23 of blocking piston 20, the valve is open and the pressure-transmitting fluid flows from regulator inlet chamber 37 to regulator outlet chamber 40 unhindered. The pressure prevailing in regulator outlet chamber 40 propagates through fluid orifices 42, annular chamber 43, fluid port 44 and fluid conduits to the wheel brake cylinders of the rear-wheel brakes.

When the pressure has reached a predetermined level, stepped piston 30 is shifted to the left against the force of control spring 49 until closure member 45 closes fluid passageway 39 by seating engagement with valve seat 47. With the pressure in the pressure chambers continuing to increase, an unreduced pressure is delivered to the front-wheel brakes, while the rear-wheel brakes receive a reduced brake pressure. With the pressure in regulator inlet chamber 37 increasing correspondingly—the pressure prevailing therein is always unreduced—stepped piston 30 is moved to the right in the direction of regulator outlet chamber 40. The valve is opened by tappet 48 which bears again against end 23 of blocking piston 20, and fluid is allowed to flow from regulator inlet chamber 37 into regulator outlet chamber 40. Stepped piston 30 then moves again to the left against the force of control spring 49.

If the rear-axle brake circuit fails because of a defect, the front-axle brake circuit remains fully operative. Since, a pressure is built up in first pressure chamber 4 and no pressure is built up in regulator outlet chamber 40, the resultant differential of pressure causes blocking piston 20 to shift to the left until end 22 is in abutment with stop 25. The volume of pressure chamber 4 is thereby enlarged so insignificantly that it does not affect the pedal travel.

Conversely, if the front-axle brake circuit fails, depression of the brake pedal causes shifting of first pressure piston 3 to the left against the force of spring 15 until conical extension 14 urges end 22 of blocking piston 20 to the left against stop 25. In the tandem-master-cylinder pressure chamber associated with the rear-axle brake circuit of the unsectioned portion of FIG. 1 a pressure is generated which, as described previously causes movement of stepped piston 30 of the regulator to the left against the force of control spring 49 until it is in abutment with stop 50. Since blocking piston 20 is in its end position close to the regulator, the valve is unable to close, and the pressure generated in the unsectioned portion of the master cylinder (the rear-axle brake circuit portion of the tandem master cylinder) is delivered to the wheel brake cylinders of the vehicle rear wheels unreduced.

By suitably dimensioning the spring force and the effective surfaces of blocking piston 20 it is possible to influence the control of the regulator valve and thus the control behavior. This can only be achieved because the pressure differential between the pressures prevailing in first pressure chamber 4 and in regulator outlet chamber 40 acts on blocking piston 20. This applies identically to the embodiment of FIG. 3 described hereinafter.

Figure 2:
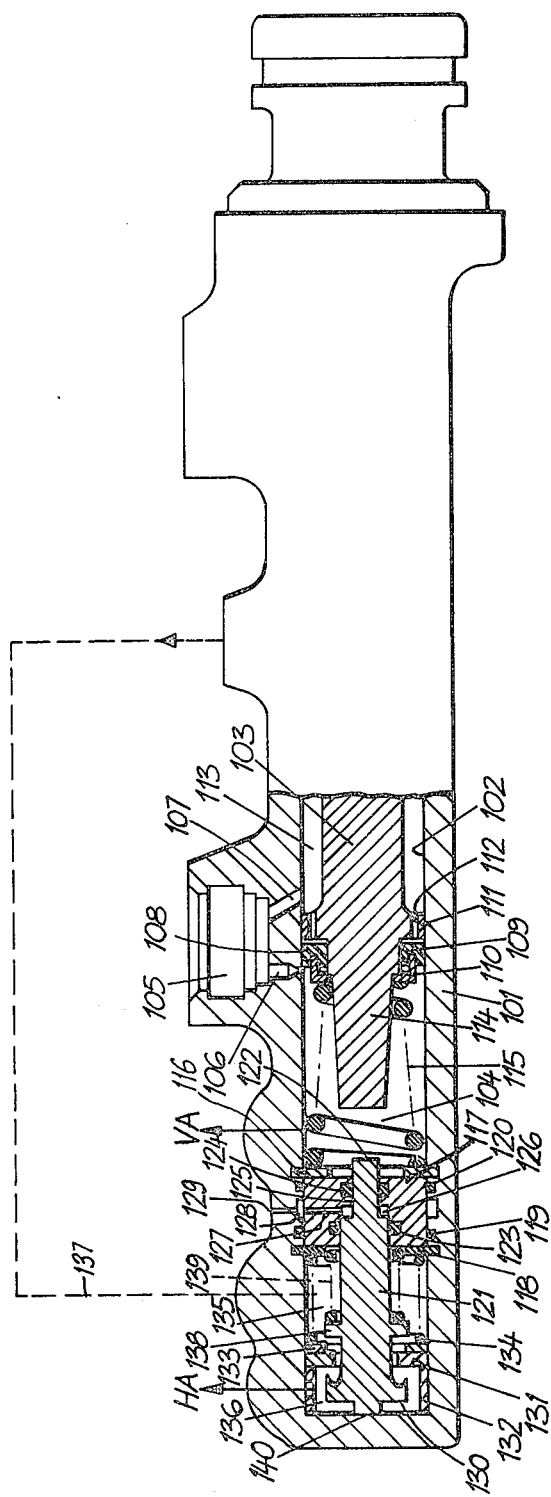
FIG. 2 is a partial longitudinal cross-sectional view of another embodiment of tandem master cylinder with a regulator disposed in the master-cylinder bore in accordance with the principles of the present invention.

FIG. 2 shows a tandem master cylinder capable of generating pressure for a first-axle brake circuit in that portion of FIG. 2 shown in section to the right of ring 116 and generating pressure for a rear-axle brake circuit in that portion of FIG. 1 not sectioned to the right of ring 116. The unsectioned portion is constructed identically to the sectioned portion, which will now be described. In a housing 101 a cylindrical bore 102 is disposed coaxially of the longitudinal axis of housing 101 and extends over the entire length of housing 101. Bore 102 accommodates a first axially slidable, cylindrical pressure piston 103 forming with its end surface a boundary for a first pressure chamber 104. First pressure chamber 104 connects with wheel brake cylinders, not shown in the drawing, of a front-axle brake circuit. This is indicated by arrow VA. Housing 101 includes a bore 105 to receive a reservoir connector (not shown) from which a feed port 106 and a compensating port 107 open into bore 102.

First pressure piston 103 has a cylindrical step 108 on which a collar seal 109 with a support ring 110 is arranged, collar seal 109 abutting against a shoulder 111 of piston 103. Shoulder 111 includes several parallel openings 112 extending from the abutment side of collar seal 109 into an annular chamber 113. In the area of annular chamber 113, compensating port 107 opens into bore 102. A conical extension 114 of pressure piston 103 projects into first pressure chamber 104.

Conical extension 114 is received in a compression spring 115 bearing with one end against support ring 110 and with its other end against a ring 116 secured in bore 102 and fastened to housing 101. Compression spring 115 serves to return first pressure piston 103. On the side of ring 116 remote from pressure piston 103, bore 102 accommodates a cylindrical sleeve 117 coaxial of the longitudinal axis of housing 101 which is secured against axial displacement by ring 116 on the one side, and by a ring 118 disposed in bore 102 and fastened to housing 101 on its other side. Sleeve 117 is sealed relative to bore 102 of housing 101 by means of two seals 119 and 120. Sleeve 117 includes a cylindrical stepped bore accommodating a slidable, cylindrical stepped piston 121 having a peg-shaped end 122 and sealed by means of seals 123 and 124 to sleeve 17. The stepped bore of sleeve 117 and piston 121 are disposed coaxial of the longitudinal axis of housing 101. Peg-shaped end 122 extends into pressure chamber 104 which is bounded by sleeve 117. The step of the bore in sleeve 117 forms a stop 125 which limits the movement of stepped piston 121 to the right in the direction of pressure chamber 104 and is situated between seals 123 and 124. A hollow space 126 which is formed between sleeve 117 and peg-shaped end 122 connects, through a radial bore 127, with an annular chamber 128 disposed between seals 119 and 120. Annular chamber 128 connects with atmosphere by means of an opening 129.

The larger step of stepped piston 121 forms a valve-closure member 130 located at a small distance from an annular valve seat 131 disposed in bore 102. Valve seat 131 bears against the front of housing 101 through a spacer ring 132. On the other side of valve seat 131 is a washer 133 on which a spring 134 bearing against ring 118 acts to the left in the direction of valve seat 131.

The side of valve seat 131 close to the smaller step of stepped piston 121 bounds a regulator inlet chamber 135 and the other side of valve seat 131 bounds a regulator outlet chamber 136. Regulator outlet chamber 136 is connected with the wheel brake cylinders, not shown in the drawing, of a rear-axle brake circuit. This is indicated by arrow HA.

Regulator inlet chamber 135 is connected with a second pressure chamber similar to pressure chamber 104 located in the portion of FIG. 2 not shown in section by means of a fluid conduit 137.

On its smaller step stepped piston 121 has a radial projection 138. Engaged between projection 138 and sleeve 117 is a control spring 139 which acts upon stepped piston 121 to the left in the direction of regulator outlet chamber 136, with stop means 140 disposed on the end surface of the larger step of stepped piston 121 being thereby urged into abutment with the front wall of housing 101 in the inoperative position.

The mode of operation of the tandem master cylinder with a regulator of FIG. 2 shall first be described for the normal case, that is, both brake circuits intact, with the front-axle brake circuit being looked at first because this mode of operation applies identically to the portion of the master cylinder not illustrated in section in FIG. 2.

When the brake pedal is depressed, first pressure piston 103 is moved to the left against the force of spring 115, whereby collar seal 109 overtravels feed port 103 and closes first pressure chamber 104. The pressure in pressure chamber 104 is increased and propagates through the brake piping to the cylinders of the front-wheel brakes. A pressure is produced in the same manner in a pressure chamber similar to pressure chamber 104 disposed in the unsectioned portion of the tandem master cylinder and is transmitted through fluid conduit 137 into regulator inlet chamber 135.

The brake fluid is initially allowed to flow from regulator inlet chamber 135 into regulator outlet chamber 136 and onwards to the wheel brake cylinders of the rear-axle brake circuit (HA) unhindered, because the force of control spring 139 keeps stepped piston 121 with its stop 140 in abutment with the front wall of housing 101. Whe the pressure has reached a predetermined level, stepped piston 121 is shifted to the right against the force of control spring 139 until closure member 130 interrupts the flow of fluid from regulator inlet chamber 135 to regulator outlet chamber 136 by seating engagement with valve seat 131. With the pressure in the pressure chambers continuing to increase, an unreduced pressure is delivered to the front-wheel brakes, while the rear-wheel brakes receive a reduced brake pressure. With the pressure in regulator inlet chamber 135 increasing correspondingly—the pressure prevailing therein is always unreduced—stepped piston 121 is moved to the left in the direction of regulator outlet chamber 136. Valve closure member 130 is thereby lifted off its valve seat 131 and fluid is allowed to flow from regulator inlet chamber 135 into regulator outlet chamber 136. Stepped piston 121 then moves again to the right against the force of control spring 139.

If the rear-axle brake circuit fails because of a defect, the front-axle brake circuit VA remains fully operative. Because the pressure chamber similar to pressure chamber 104 situated in the portion of FIG. 2 not shown in section, is not pressurized, the brake pedal travel becomes necessarily longer. This is the case with all tandem master cylinders. In this arrangement, there occurs no increased fluid volume consumption in the front-axial brake circuit which is conditioned by the regulator, i.e., the increased brake pedal travel is not caused by the regulator.

Conversely, if the front-axle brake circuit fails, depression of the brake pedal causes shifting of first pressure piston 103 to the left against the force of spring 115 until conical extension 114 is in abutment with peg-shaped end 122 of stepped piston 121. Stepped piston 121 is thereby urged, with its stop 140, against the front wall of housing 101, and the valve cannot close. The pressure produced in the master cylinder is delivered to the wheel brake cylinders of the vehicle rear wheels unreduced.

Figure 3:
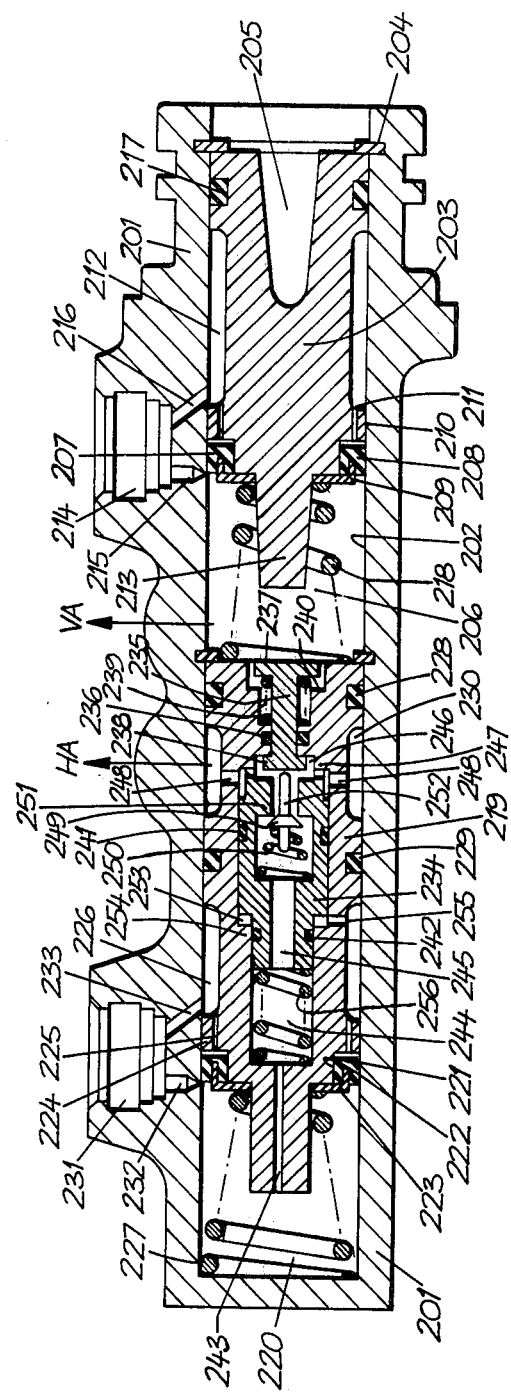
FIG. 3 is a longitudinal cross-sectional view of a third embodiment of a tandem master cylinder and a regulator in accordance with the principles of the present invention where the regulator is disposed in a master-cylinder piston.

FIG. 3 shows a housing 201 having a cylindrical bore 202 receiving therein in an axially slidable relationship a first cylindrical, axially slidable pressure piston 203 which is prevented from leaving bore 202 by means of a ring 204 located in bore 202 close to the bore's end and fastened to housing 201. Bore 202 and piston 203 are disposed coaxial of the longitudinal axis of housing 201. First pressure piston 203 has on its end close to ring 204 a conical opening 205 which is engaged by the end of a push-rod coupled to a brake pedal (not shown). The other end of first pressure piston 203 forms a boundary for a first pressure chamber 206 which connects with wheel brake cylinders, not shown in the drawing, of a front-axle brake circuit. This is indicated by arrow VA.

First pressure piston 203 has a cylindrical step 207 on which a collar seal 208 with a support ring 209 is arranged, collar seal 208 abutting against a shoulder 210 of pressure piston 203. Shoulder 210 includes several parallel openings 211 extending from the abutment side of collar seal 208 into an annular chamber 212. A conical extension 213 of pressure piston 203 projects into first pressure chamber 206.

Housing 201 includes a bore 214 to receive a reservoir connector from which a feed port 215 and a compensating port 216 open into bore 202, feed port 215 terminating in pressure chamber 206 directly in front of collar seal 208 and compensating port 216 terminating in annular chamber 212. In its portion adjacent to ring 204, first pressure piston 203 is provided with a seal 217 which rests against the wall of bore 202 of housing 201. Conical extension 213 is received in a compression spring 218 bearing with one end against support ring 209 and with its other end against a second cylindrical pressure piston 219 coaxial of the longitudinal axis of housing 201 and axially slidable in bore 202. The end surface of second pressure piston 219 against which spring 218 bears forms a boundary for first pressure chamber 206 while the other piston end surface bounds a second pressure chamber 220.

Second pressure piston 219 has a cylindrical step 221 on which a collar seal 222 with a support ring 223 is arranged, collar seal 222 abutting against a shoulder 224 of pressure piston 219. Shoulder 224 includes several parallel bores 225 extending from the abutment side of collar seal 222 into an annular chamber 226. Second pressure chamber 220 houses a compression spring 227 which is engaged between the front wall of bore 202 and support ring 223.

Provided close to the end of second pressure piston 219 bounding first pressure chamber 206 is a seal 228, and approximately in the middle of the piston length is a seal 229, the seals sealing pressure piston 219 relative to bore 202 of housing 201. Annular chamber 226 is disposed between collar seal 222 and seal 229, and another annular chamber 230 is disposed between seals 228 and 229.

Housing 201 includes a second bore 231 to receive a second fluid reservoir connector from which a feed port 232 and a compensating port 233 open into bore 202, feed port 232 terminating in pressure chamber 220 directly in front of collar seal 222 and compensating port 233 terminating in annular chamber 226.

Second pressure piston 219 includes a multiple stepped cylindrical bore coaxial of the longitudinal axis of the housing 201 accommodating in its middle part a cylindrical, axially slidable stepped piston 234 and in the part close to pressure chamber 206 a cylindrical, axially slidable piston 235 coaxial of the longitudinal axis of housing 201 which, because of its function, is referred to as a blocking piston in the following description. Blocking piston 235 is sealed relative to the wall of bore 202 by means of a seal 236. The ends 237 and 238 of blocking piston 235 have radial extensions serving to limit its axial movement. A helical spring 239 is engaged between a step of the bore of second pressure piston 219 and end 237 and its force acts upon blocking piston 235 to the right in the direction of first pressure chamber 206 whereby in the inactive position of the arrangement end 237 is held at a specific distance from a stop 240.

Stepped piston 234 is sealed relative to second pressure piston 219 by means of two seals 241 and 242. An axial fluid passageway 243 in pressure piston 219 connects second pressure chamber 220 with a regulator inlet chamber 244 which is bounded by the end surface of the smaller step of stepped piston 234. A coaxial fluid passageway 245 in the interior of stepped piston 234 connects regulator inlet chamber 244 with a regulator outlet chamber 246 which is bounded by the end surface of the larger step of stepped piston 234. On the end surface of the larger step of stepped piston 234, stop means 247 is provided through which stepped piston 234 bears against a step of the bore of pressure piston 219. Fluid orifices 248 disposed radially in pressure piston 219 connect regulator outlet chamber 246 with annular chamber 230 which connects with wheel brake cylinders, not shown in the drawing, of a rear-axle brake circuit. This is indicated by arrow HA.

Fluid passageway 245 houses a valve-closure member 249 which is loaded against a valve seat 251 by a spring 250. Valve-closure member 249 includes a tappet 252 which extends out of stepped piston 234 and bears against end 238 of blocking piston 235.

An annular surface of the larger step of stepped piston 234 forms a boundary for an annular chamber 253 whose opposite wall forms a stop 254 limiting the travel displacement of stepped piston 234. Annular chamber 253 is connected with the annular chamber 226 through a radial bore 255. The smaller step of stepped piston 234 is loaded by a control spring 256 which with its other end bears against a front wall of the bore of second pressure piston 219.

The mode of operation of the tandem master cylinder with a regulator of FIG. 3 shall first be described for the case of both brake circuits being intact. When the brake pedal is depressed, first pressure piston 203 is moved to the left against the force of compression spring 218, and second pressure piston 219 is moved to the left against the force of compression spring 227, whereby collar seals 208 and 222 overtravel feed ports 215 and 233 and close pressure chambers 206 and 220. The pressure generated in first pressure chamber 206 propagates through the brake piping to the wheel brake cylinders of the front-wheel brakes VA.

Second pressure chamber 220 is pressurized to the same level as first pressure chamber 206, the pressure therein being transmitted through axial fluid passageway 243 into regulator inlet chamber 244. Since stepped piston 234 is initially urged with its stop means 247 to the right against a step in the bore of second pressure piston 219 by the force of control spring 256, as a result of which tappet 252 of valve-closure member 249 is in abutment with end 238 of blocking piston 235, the valve is open and the pressure-transmitting fluid flows from regulator inlet chamber 244 to regulator outlet chamber 246 unhindered. The pressure prevailing in regulator outlet chamber 246 propagates through fluid orifices 248, annular chamber 230 and fluid conduits to the wheel brake cylinders of the rear-wheel brakes HA.

When the pressure has reached a predetermined level, stepped piston 234 is shifted to the left against the force of control spring 256 until valve-closure member 249 closes fluid passageway 245 by seating engagement with valve seat 251. With the pressure in the pressure chambers continuing to increase, an unreduced pressure is delivered to the front-wheel brakes, while the rear-wheel brakes receive a reduced brake pressure. With the pressure in regulator inlet chamber 244 increasing correspondingly, stepped piston 234 is moved to the right in the direction of blocking piston 235. The valve is opened by tappet 252 which bears again against end 238 of blocking piston 235, and fluid is allowed to flow from regulator inlet chamber 244 into regulator outlet chamber 246. The stepped piston 234 then moves again to the left against the force of control spring 256.

If the rear-axle brake circuit fails because of a defect, second pressure piston 219 is shifted to the left until it is in abutment with the front wall of housing 201. The front-axle brake circuit remains fully operative, only the pedal travel is longer. Since pressure is built up in first pressure chamber 206 and no pressure is built up in regulator outlet chamber 246, the resulting differential of pressure causes blocking piston 235 to shift to the left until end 237 is in abutment with stop 240. The volume of pressure chamber 206 is thereby enlarged so insignificantly that it does not affect the pedal travel.

Conversely, if the front-axle brake circuit fails, depression of the brake pedal causes shifting of first pressure piston 203 to the left against the force of spring 218 until conical extension 213 urges end 237 of blocking piston 235 against stop 240. In second pressure chamber 220 a pressure is generated which, as described previously, is delivered to the wheel brake cylinders of the rear axle HA through the regulator and fluid conduits. Though stepped piston 234 is displaced to the left against the force of control spring 256 until it is in abutment with stop 254, the valve cannot close because blocking piston 235 is in its end position close to the regulator. Thus, in the event of a failure of the front-axle brake circuit, the wheel brake cylinders of the vehicle rear wheels receive the unreduced pressure.

While we have described above the principles of our invention in connection with specific apparatus it is to be clearly understood that this description is made only by way of example and not as a limitation to the scope of our invention as set forth in the objects thereof and in the accompanying claims.

We claim:

1. A tandem master cylinder with a regulator for a vehicle hydraulic brake system comprising:
    a first pressure piston;
    a first pressure chamber bounded by one end of said first pressure piston coupled to a front-axle brake circuit;
    a second pressure chamber connected to a regulator input of said regulator, said regulator being disposed adjacent the other boundary of said first pressure chamber and further including a regulator output coupled to a rear-axle brake circuit, at least one stepped piston loaded by a control spring and a regulator valve; and
    means associated with said first pressure piston and said regulator valve to mechanically actuate said regulator valve by said first pressure piston to maintain said regulator valve open upon failure of said front-axle brake circuit.

2. A master cylinder according to claim 1, wherein said means includes
    an extension of said first pressure piston projecting into said first pressure chamber.

3. A master cylinder according to claim 2, wherein said regulator valve includes
    a control device subjected to pressure in said first pressure chamber.

4. A master cylinder according to claim 3, wherein said control device includes
    a blocking piston preloaded by a spring in opposition to the direction of mechanical actuation of said regulator valve.

5. A master cylinder according to claim 4 wherein said regulator is disposed in a tandem master cylinder housing.

6. A master cylinder according to claim 5, wherein said housing includes
    a smooth bore in which said first pressure piston and said regulator are disposed in tandem.

7. A master cylinder according to claim 6, wherein said regulator valve is disposed within said stepped piston,
    an annular surface of the smaller step of said stepped piston forming a boundary for a regulator inlet chamber connected to said regulator input, and
    the end surface of the larger step of said stepped piston forming a boundary for a regulator outlet chamber connected to said regulator output.

8. A master cylinder according to claim 7, wherein said regulator valve includes
a valve-closure member having a tappet bearing against an adjacent end of said blocking piston.

9. A master cylinder according to claim 8, wherein
the maximum displacement travel of said stepped piston is greater than the closing travel of said regulator valve, and
the displacement travel of said blocking piston is greater than the difference between the displacement travel of said stepped piston and the closure travel of said regulator valve.

10. A master cylinder according to claim 7, wherein said stepped piston is disposed in a multiple stepped bore of at least one sleeve.

11. A master cylinder according to claim 10, wherein
said sleeve is secured at its end adjacent said first pressure chamber by a ring disposed in said bore and secured to said housing and on its other end by a coupling nut screwed onto the adjacent end of said housing.

12. A master cylinder according to claim 2, wherein said regulator valve includes
the large step of said stepped piston formed as a valve-closure member, and
a ring disposed about the smaller step of said stepped piston to provide a valve seat for said valve-closure member.

13. A master cylinder according to claim 12, wherein said stepped piston includes
a peg-shaped end extending from the end of its smaller step into said first pressure chamber, and
a stop extending from the end of its larger step.

14. A master cylinder according to claim 12, wherein
the side of said ring adjacent said regulator output bears against an end wall of a master cylinder housing through the intermediary of a spacer ring, and
the opposite side of said ring bears against a component adjacent said other boundary of said first pressure chamber secured in said housing through the intermediary of a washer and a spring.

15. A master cylinder according to claim 2, wherein said regulator is disposed in the interior of a second pressure piston having one end thereof defining said other boundary of said first pressure chamber.

16. A master cylinder according to claim 15, wherein said second pressure piston includes
an annular chamber adjacent the outer surface thereof in communication with a regulator outlet chamber and said rear-axle brake circuit.

17. A master cylinder according to claim 16, wherein said second piston includes
a multiple stepped coaxial bore to accommodate a blocking piston adjacent said first pressure chamber, said stepped piston in a middle portion thereof and a control spring disposed between an end wall of said bore and an end of said stepped piston remote from said blocking piston.

18. A master cylinder according to claim 1, wherein said regulator valve includes
a control device subjected to pressure in said first pressure chamber.

19. A master cylinder according to claim 18, wherein said control device includes
a blocking piston preloaded by a spring in opposition to the direction of mechanical actuation of said regulator valve.

20. A master cylinder according to claim 19, wherein said regulator is disposed in a tandem master cylinder housing.

21. A master cylinder according to claim 20, wherein said housing includes
a smooth bore in which said first pressure piston and said regulator are disposed in tandem.

22. A master cylinder according to claim 21, wherein said regulator valve is disposed within said stepped piston,
an annular surface of the smaller step of said stepped piston forming a boundary for a regulator inlet chamber connected to said regulator input, and
the end surface of the larger step of said stepped piston forming a boundary for a regulator outlet chamber connected to said regulator output.

23. A master cylinder according to claim 22, wherein said regulator valve includes
a valve-closure member having a tappet bearing against an adjacent end of said blocking piston.

24. A master cylinder according to claim 23, wherein
the maximum displacement travel of said stepped piston is greater than the closing travel of said regulator valve, and
the displacement travel of said blocking piston is greater than the difference between the displacement travel of said stepped piston and the closure travel of said regulator valve.

25. A master cylinder according to claim 22, wherein said stepped piston is disposed in a multiple stepped bore of at least one sleeve.

26. A master cylinder according to claim 25, wherein
said sleeve is secured at its end adjacent said first pressure chamber by a ring disposed in said bore and secured to said housing and on its other end by a coupling nut screwed onto the adjacent end of said housing.

27. A master cylinder according to claim 1, wherein said regulator is disposed in a tandem master cylinder housing.

28. A master cylinder according to claim 27, wherein said housing includes
a smooth bore in which said first pressure piston and said regulator are disposed in tandem.

29. A master cylinder according to claim 28, wherein said regulator valve is disposed within said stepped piston,
an annular surface of the smaller step of said stepped piston forming a boundary for a regulator inlet chamber connected to said regulator input, and
the end surface of the larger step of said stepped piston forming a boundary for a regulator outlet chamber connected to said regulator output.

30. A master cylinder according to claim 29, wherein said stepped piston is disposed in a multiple stepped bore of at least one sleeve.

31. A master cylinder according to claim 30, wherein
said sleeve is secured at its end adjacent said first pressure chamber by a ring disposed in
said bore and secured to said housing and on its other end by a coupling nut screwed onto the adjacent end of said housing.

32. A master cylinder according to claim 1, wherein said housing includes
a smooth bore in which said first pressure piston and said regulator are disposed in tandem.

33. A master cylinder according to claim 32, wherein said regulator valve is disposed within said stepped piston, an annular surface of the smaller step of said stepped piston forming a boundary for a regulator inlet chamber connected to said regulator input, and the end surface of the larger step of said stepped piston forming a boundary for a regulator outlet chamber connected to said regulator output.

34. A master cylinder according to claim 33, wherein said stepped piston is disposed in a multiple stepped bore of at least one sleeve.

35. A master cylinder according to claim 34, wherein said sleeve is secured at its end adjacent said first pressure chamber by a ring disposed in said bore and secured to said housing and on its other end by a coupling nut screwed onto the adjacent end of said housing.

36. A master cylinder according to claim 1, wherein said regulator valve is disposed within said stepped piston, an annular surface of the smaller step of said stepped piston forming a boundary for a regulator inlet chamber connected to said regulator input, and the end surface of the larger step of said stepped piston forming a boundary for a regulator outlet chamber connected to said regulator output.

37. A master cylinder according to claim 36, wherein said stepped piston is disposed in a multiple stepped bore of at least one sleeve.

38. A master cylinder according to claim 37, wherein said sleeve is secured at its end adjacent said first pressure chamber by a ring disposed in said bore and secured to said housing and on its other end by a coupling nut screwed onto the adjacent end of said housing.

39. A master cylinder according to claim 1, wherein said stepped piston is disposed in a multiple stepped bore of at least one sleeve.

40. A master cylinder according to claim 38, wherein said sleeve is secured at its end adjacent said first pressure chamber by a ring disposed in said bore and secured to said housing and on its other end by a coupling nut screwed onto the adjacent end of said housing.

* * * * *